Jan. 10, 1961    R. E. REINHARDT    2,967,659
SAMPLER AND TIMBER TALLY

Filed Feb. 14, 1958    2 Sheets-Sheet 1

INVENTOR
ROBERT E. REINHARDT

BY R. Hoffman  ATTORNEY

Jan. 10, 1961  R. E. REINHARDT  2,967,659
SAMPLER AND TIMBER TALLY
Filed Feb. 14, 1958  2 Sheets-Sheet 2

INVENTOR
ROBERT E. REINHARDT

BY R. Hoffman
ATTORNEY

United States Patent Office 2,967,659
Patented Jan. 10, 1961

2,967,659

SAMPLER AND TIMBER TALLY

Robert E. Reinhardt, 3483 S. Utah St., Arlington, Va.

Filed Feb. 14, 1958, Ser. No. 715,477

4 Claims. (Cl. 235—1)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to a sampling device for tallying and sampling a plurality of objects at predetermined intervals. More particularly it relates to a device whereby it is possible to count the number of trees or logs in a given area and select those for sampling for any desired purpose. One such purpose, for example, might be to determine the volume of timber within any selected area.

It has been found that human bias, both conscious and unconscious, is a considerable factor leading to the introduction of serious errors into processes of selecting true or representative samples. Thus, to improve the accuracy of any sampling method, it is desirable to eliminate as much as possible the element of bias in the person taking the samples.

One object of this invention, therefore, is to provide a tallying device which will indicate to the user which of a number of counted trees he should take as his sample. Another object is to provide such a device in which the choice of sample is made on as nearly a random basis as possible. A further object is to provide a tallying device by means of which samples may be taken simultaneously in a number of different strata or categories. A still further object is to provide such a device capable of sampling at a number of different predetermined and selected intervals. Other objects will be apparent to those skilled in the art.

In general, the invention comprises a base mounting plate and a cover with a plurality of disc dials rotatably mounted therebetween, each of the discs being provided with a predetermined number of subdivisions or indicia disposed in a series of concentric circles extending radially inward from the periphery of the disc. The indicia in the outermost or peripheral circle are evenly spaced from each other while the indicia in each of the inner circles are in a predetermined ratio to the indicia in the peripheral circle and are randomly spaced from each other.

In designing the discs it is important that the random spacing be different in each disc. Windows are provided in the cover plate located over each of the concentric circles so that the indicia will appear in these windows when the discs are rotated.

The invention will be more fully described below with reference being made to the accompanying drawings in which.

Figure 1:
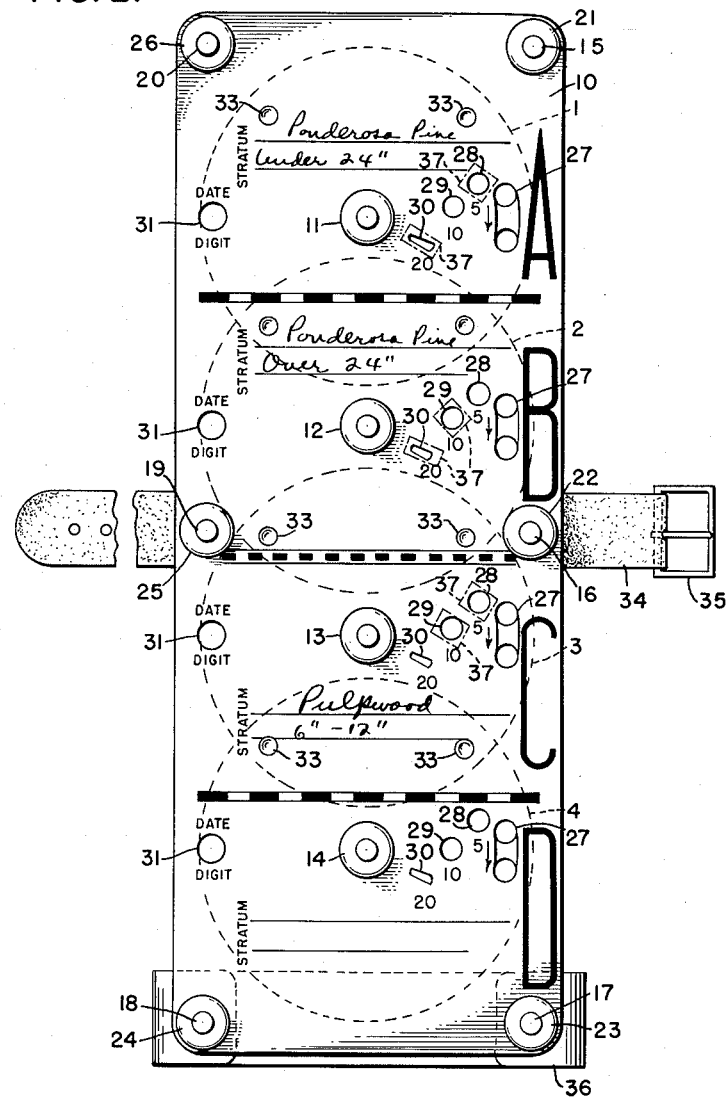
Figure 1 represents the front view of a preferred form of sampler completely assembled.
Figure 2:
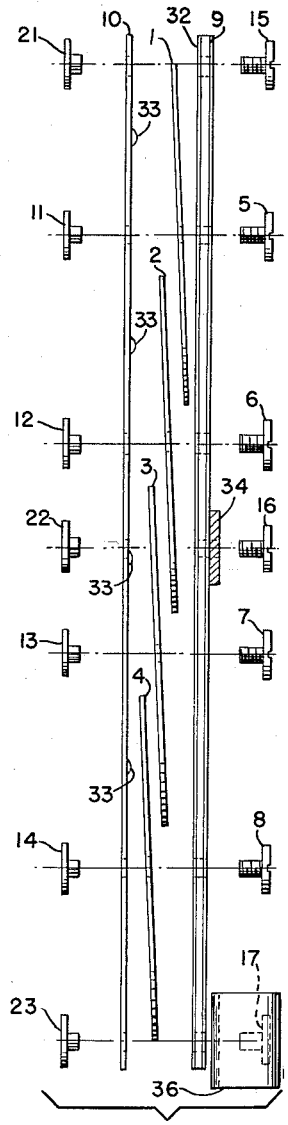
Figure 2 is an exploded side view showing relationships of the several indicating dials and their mounting means.
Figure 3:
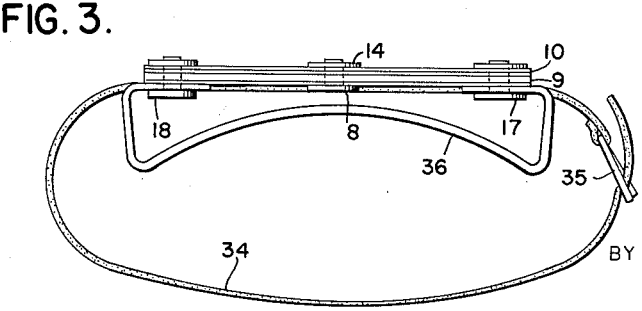
Figure 3 is an end view of an assembled sampler showing the means by which the device is carried about during use.

More particularly, the sampling device indicated comprises four rotating indicator disc dials 1–4 rotatably mounted by means of screws 5–8, respectively between base plate 9 and cover plate 10. Screws 5–8 are secured by means of nuts 11–14, respectively. Cover plate 10 is secured to base plate 9 by means of screws 15–20 and nuts 21–26, respectively.

The indicator disc dials are each provided with a series of subdivisions, such as, holes, or other indicia, each series being located on a different concentric circle. As indicated in Figures 6–9, a preferred form of dial contains twenty evenly-spaced holes 38, 39, 40, and 41 in the outermost or peripheral circle of each dial. The second circle of each disc contains only four holes 42, 43, 44, and 45 randomly spaced; the third circle of each disc contains two holes 46, 47, 48, and 49, not equidistant from each other; and the innermost circle of each disc contains only 1 hole 50, 51, 52, and 53. It will be noted that the random spacing of the holes in the four- and two-hole circles is different in each one of the four dials. The reason for this will be explained below. As constructed, it will be apparent that, in each disc dial, the ratio of holes in the second circle to the holes in the peripheral or outermost circle is 1:5, that of the third circle is 1:10, and that of the fourth, or innermost, circle is 1:20.

Figure 4:
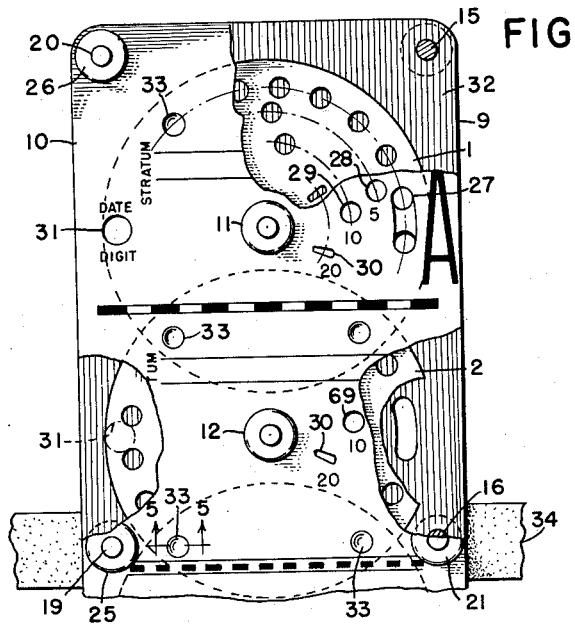
Figure 4 is another view of the front of the sampler, partly in section, showing the relationship between the indicating dials and the face of the device.
Figure 5:
Figure 5 is a section on line 5—5 of Figure 4 showing the means by which accidental slipping of the dials from any particular setting is prevented.
Figure 6:
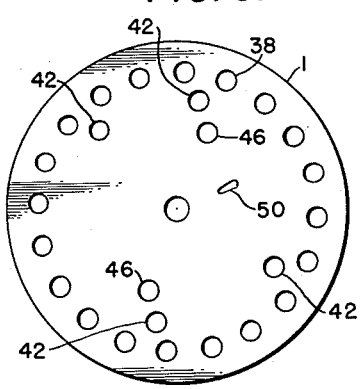
Figures 6–9, inclusive, show four indicating dials, each having a different random arrangement of holes, the purpose of which will be explained below.
Figure 7:
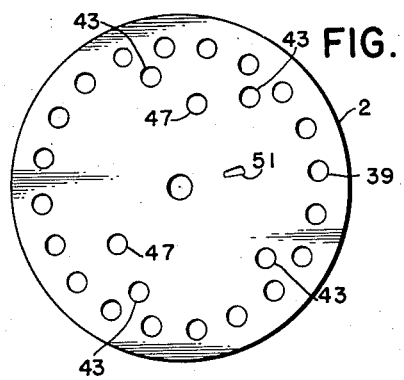
Figure 8:
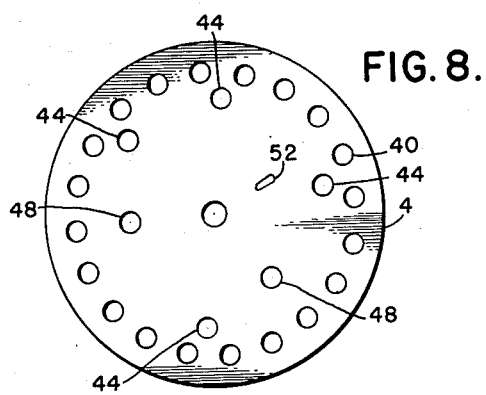
Figure 9:
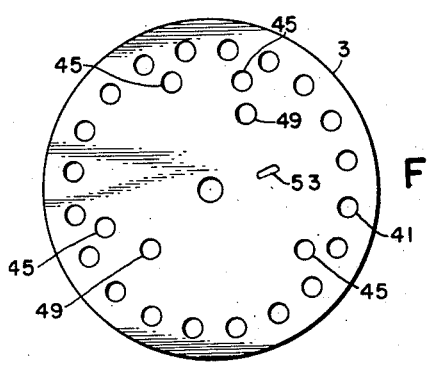

Cover plate 10 is provided with a number of holes 27–30, one located over the centerline of each of the concentric circles of holes of each of dials 1–4. As shown in Figures 1 and 4, hole 27 is in reality a slot of such dimensions that it uncovers completely two holes of the outermost circle of the rotating dial. Holes or sampling windows 28, 29, and 30 each uncover only one hole of the second, third, and fourth circles, respectively. A fifth hole 31 is provided in the cover plate over each dial located in such position as to expose the unperforated portion of the dial between the periphery and the first circle of holes. Base plate 9 is provided on its inner side with a colored surface 32, as for example, red. Thus, when a hole in a dial appears under a hole in cover plate 10, the colored surface 32 will show through. In this manner, for each complete revolution of a dial a red dot will appear four times in hole 28, twice in hole 29, and once in hole 30.

Cover plate 10 is further provided with a number of indentations 33 located concentrically with the outermost circle of holes in each dial. These indentations are of sufficient length so that when the device is completely assembled the dials are sufficiently compressed between the cover and base plates to permit each indentation to fill a hole in the dial, thereby preventing undesired rotation. By making the cover plate and the dials of resilient material it is possible with little effort to rotate the dial one hole at a time by inserting the point of a pencil or the like into the hole appearing at one end of slot 27 and moving it to the other end of the slot. The indentations will insure that no motion of a dial occurs except by intention.

As shown in Figure 1, the cover plate is divided into four sections, each corresponding to one of the underlying dials. Each of the sections may be designated by any suitable symbol, as for example, "A," "B," "C," and "D" to indicate the stratum or category being sampled. Obviously, it is possible to carry on four sampling operations on different strata simultaneously. Each section is further provided with space in which the user can enter the name of the stratum being sampled. The surface of the cover plate may be roughened so that one can write on it with a pencil. After the sampling is completed the writing may be erased and the device becomes ready for reuse. Near each one of holes 28, 29, and 30, in each section, there is printed the ratio of holes in the underlying circle to the holes in the outermost circle. Thus, hole 28 is designated by the character "5" to indicated a 1:5 ratio, hole 29 by "10" to indicate a 1:10 ratio, and hole 30 by "20" to indicate a 1:20 ratio. Hole 31 is designated "date digit," and its function will be explained below.

The sampling device of this invention may be carried on the forearm of the user and secured thereto by means of strap 34 and buckle 35, fastened to the back of device by any suitable means, such as, screws 16 and 19. A small bracket 36, curved to fit the contour of the arm, is also secured to the back of the device at one end thereof. This bracket serves to slightly raise the device from the user's arm while at the same time preventing slipping.

The sampling device may be made of any stiff resilient material. An opaque sheet of a vinyl resin has been found satisfactory for the cover plate and dials. A less expensive transparent heavier sheet plastic may be used for the base plate 9 and a thin sheet of colored resin laminated thereto to provide the colored surface 32. Other suitable materials may be used without departing from the spirit of the invention.

It will also be obvious to those skilled in the art that certain modifications may be made without departing from the spirit of the invention. Thus, instead of having a series of concentric holes in the several dials for the 5, 10, and 20 ratios, the dials may be imprinted with colored dots.

As an illustration of the method of using the sampling device, let it be assumed that a particular portion of a pine forest is being measured to determine the volume of timber therein. The woodsman will enter the name of each stratum to be tallied on the cover plate in the appropriate section. Thus, for example, stratum "A" will be designated "Ponderosa pine, under 24"," stratum "B" will be designated "Ponderosa pine, over 24"," and stratum "C" will be designated "Pulpwood, 6"–12"." When the proper sampling interval or ratio has been determined by means of a statistical analysis, the unused sampling windows are covered with a piece of opaque pressure-sensitive adhesive tape 37.

To prepare the sampler for the job, each dial must be randomized. This is accomplished by covering the exposed sampling window with a finger and turning the dial a random number of times with a pencil or other pointed object in the dual hole slot 27. If red is visible when the finger is removed the process must be repeated. The last digit of the current date is then entered in the "date digit" hole and the sampler is now ready for use. This serves as a reference point to indicate a complete revolution of the dial.

The user then decides which tree will be counted and marked first prior to even deciding whether it will be a sample. As each tree is marked the appropriate dial is moved one hole in the direction of the arrow until red appears in the window. The tree at which the red mark appears is measured as a sample tree. Counting continues until the entire operation is completed or work stops for the day. In the latter case, the process merely continues the following day or days until the operation is completed.

After completion, it is necessary to determine the total tally of trees marked. The number of trees actually sampled and measured is known because each measurement was recorded as it was made. The total tally is made as illustrated by the following example:

The total number of Ponderosa pine over 24" is desired.

As previously indicated, a sampling interval of 1 in 5 was selected on the basis of a statistical analysis. Since there are twenty holes in the outermost circle of the dial, twenty trees will have been marked each time the date digit entered in pencil in hole 31 reappears. With 1 to 5 sampling intervals, four trees are sampled and measured for each complete revolution of the dial. Thus, if, for example 13 trees were sampled and measured during the day, the total number of trees marked and counted will be approximately $13 \times 5$, or 65 trees.

To determine the actual number, the dial is turned, one hole at a time until the date digit reappears, note being made of the number of times it was necessary to turn the dial and of the number of times a red dot appeared in the window. Assume that it was necessary to turn the dial 17 times and that a red dot appeared three times before the date digit showed in the window. The number of red dots to appear (3) is added to the number of samples taken (13) and the sum multiplied by the sampling interval $[(13+3) \times 5=80]$ to give a tentative total (80). (This will always be some exact multiple of 20.) The correct total is then obtained by subtracting the number of times it was necessary to turn the dial to make the date digit reappear (17) from the tentative total $(80-17=63)$. The actual number trees counted during that day was 63.

As indicated above, the sequence of holes is different in each of the four dials. Thus, by using different dials at different times, memorization of the periodicity of the holes in any dial is avoided and in this way the subconscious introduction of bias is minimized. In addition, the dials may from time to time be removed and reversed. By reversing the four discs (Figures 6–9) and placing them in various random combinations in any of the four different positions possible a total of 384 different variations of the selector may be obtained. Under these conditions it is virtually impossible to memorize the dials.

It will also be noted that by combining more than one exposed sampling window the percentage of sample can be varied from the three sampling intervals shown. For instance, by exposing the sampling window marked "20" (hole 30) as well as the sampling window marked "5" (hole 28) and taking a sample every time the colored base plate (32) is shown, a sampling interval of one-in-four (or 25%) is obtainable. Thus percentages of sample taken may be 5%, 10%, 20%, 25%, 30% and 35%.

I claim:

1. A device for sampling and tallying which comprises a base mounting plate and a cover therefor; a plurality of disc dials rotatably mounted between said base plate and cover, each of said disc dials being provided with a predetermined number of indicia disposed in a series of concentric circles extending radially inward from the periphery of the disc, the outermost or peripheral circle containing said indicia equally spaced from each other, the indicia in each of the inner circles being different in number from each other and fewer in number than the indicia in the peripheral circle and in a predetermined ratio to the indicia in the peripheral circle, the indicia in each of said inner circles being randomly spaced from each other; said cover being provided with a window over each of the inner concentric circles of the disc whereby the indicia on said disc will appear in said windows when the disc is rotated; reference means to indicate a complete revolution of the dial; and means for preventing rotation of the disc more than one peripheral indicium at a time.

2. A device for sampling and tallying which comprises a colored base mounting plate and a cover therefor; a plurality of disc dials rotatably mounted between said base plate and cover, each of said disc dials being provided with a predetermined number of holes disposed in a series of concentric circles extending radially inward from the periphery of the disc, the outermost or peripheral circle containing said holes equally spaced from each other, the holes in each of the inner circles being different in number from each other and fewer in number than the holes in the peripheral circle and in a predetermined ratio to the holes in the peripheral circle, the holes in each of said inner circles being randomly spaced from each other; said cover being provided with windows over the inner concentric circles of the disc whereby the holes in the disc will appear in said windows and expose the colored mounting plate when the disc is rotated; reference means to indicate a complete revolution of the dial; and means for preventing rotation of the disc more than one peripheral hole at a time.

3. A device for sampling and tallying which comprises a colored base mounting plate and a resilient cover therefor; a plurality of resilient disc dials rotatably mounted between said base plate and cover, each of said disc dials being provided with a predetermined number of holes disposed in a series of concentric circles extending radially inward from the periphery of the disc, the outermost or peripheral circle containing said holes equally spaced from each other, the holes in each of the inner circles being different in number from each other and fewer in number than the holes in the peripheral circle and in a predetermined ratio to the holes in the peripheral circle, the holes in each of said inner circles being randomly spaced from each other; said cover being provided with a window over each of the inner concentric circles of the disc whereby the holes in the disc will appear in said window and expose the colored mounting plate when the disc is rotated; said cover being also provided with a window over an unperforated portion of each disc to expose a reference mark inscribed on said unperforated portion of each disc to indicate a complete revolution of the dial; said cover being further provided with an elongated curved slot concentric with the circle of peripheral holes on each disc, said slot being of sufficient length to completely uncover two adjacent holes in said peripheral circle; and indentations on the cover extending in the direction of the discs, said indentations being so located and of sufficient depth to engage a hole in the peripheral circle thereby to prevent inadvertent rotation of a disc more than one hole at a time and to retain a given setting of the dial.

4. The device of claim 3 in which the random spacing of the holes in the inner circles of the discs is different in each of said discs.

References Cited in the file of this patent

UNITED STATES PATENTS

| | | |
|---|---|---|
| 598,509 | Hall | Feb. 8, 1898 |
| 1,046,433 | Bishop et al. | Dec. 10, 1912 |
| 1,198,851 | Key | Sept. 19, 1916 |
| 2,594,566 | Kesling | Apr. 29, 1952 |

FOREIGN PATENTS

| | | |
|---|---|---|
| 870,966 | Germany | Mar. 19, 1953 |